United States Patent [19]

Wang

[11] Patent Number: 4,992,526
[45] Date of Patent: Feb. 12, 1991

[54] PREPARATION OF POLYARYLATE POLYMERS OF HYDROXYARYL-SUBSTITUTED 1,6-DIAZA [4.4] SPIRODILACTAMS

[75] Inventor: Pen-Chung Wang, Houston, Tex.

[73] Assignee: Shell Oil Company, Houston, Tex.

[21] Appl. No.: 454,245

[22] Filed: Dec. 21, 1989

[51] Int. Cl.$^5$ .............................................. C08G 63/02
[52] U.S. Cl. ................................... 528/179; 528/176; 528/180; 528/193; 528/182; 528/185; 528/190
[58] Field of Search .............. 528/176, 179, 180, 193, 528/182, 185, 190

[56] References Cited

U.S. PATENT DOCUMENTS

| | | | |
|---|---|---|---|
| 3,216,970 | 11/1965 | Conix | 528/176 |
| 4,652,608 | 3/1987 | Parker | 525/132 |
| 4,829,144 | 5/1989 | Brunelle | 528/176 |

Primary Examiner—Harold D. Anderson
Assistant Examiner—T. Mosley

[57] ABSTRACT

High molecular weight polyarylate polymers comprise alternating moieties derived from an aromatic dicarboxylic acid halide, with moieties derived from a hydroxyaryl-substituted 1,6-diaza [4.4] spirodilactam compound and, optionally, with moieties derived from a di(hydroxyphenyl) compound are prepared by interfacial polymerization in an aqueous-organic medium containing an alcohol.

40 Claims, No Drawings

PREPARATION OF POLYARYLATE POLYMERS OF HYDROXYARYL-SUBSTITUTED 1,6-DIAZA [4.4] SPIRODILACTAMS

FIELD OF THE INVENTION

The invention relates to the preparation of high molecular weight alternating polyarylate polymers incorporating moieties derived from an aromatic diacid halide, a hydroxyaryl-substituted spirodilactam compound and, optionally a di(hydroxyphenyl) compound by interfacial polymerization.

BACKGROUND OF THE INVENTION

Among the types of thermoplastics which incorporate a plurality of cyclic structures is the class known as polyarylate polymers. the polyarylates are typically esters of aromatic diacids and dihydric phenols. In such polymers, when 1,6 di(4-hydroxyphenyl)-substituted 1,6-diaza [4.4] spirodilactams are employed as the phenolic component, high molecular weight polymers are difficult to prepare because the reaction medium tends to form an emulsion from which it is difficult to separate and recover the polymer. In U.S. Pat. No. 4,829,144 on preparing polyarylates of spirobiindane bisphenols, it is disclosed that the presence of alcohols in the reaction medium are not suitable because they will preferentially react with the dicarboxylic acid halide. However, Applicant has found that such a preferential reaction does not occur in preparing polyarylates of the [4.4] spirodilactams and that the presence of a deemulsifying agent, such as an alcohol, prevents or breaks emulsions.

SUMMARY OF THE INVENTION

This invention provides for the preparation of high molecular weight polyarylate polymers having moieties derived from an aromatic dicarboxylic halide alternating with moieties of an oxyaryl-substituted 1,6-diaza [4.4] spirodilactam compound and, optionally, moieties of a di(oxyphenyl) compound by interfactial polymerization in an aqueous-organic medium containing a deemulsifying agent.

DETAILED DESCRIPTION OF THE INVENTION

The high molecular weight polyarylate polymers of the invention are produced by the reaction of a metal salt, particularly (an alkali metal salt of) a 1,6-diaza [4.4] spirodilactam having a hydroxyaryl substituent on each of the spiro ring nitrogen atoms, and, optionally, (an alkali metal salt of) a di(hydroxyphenyl) compound, with an aromatic dicarboxylic acid halide, i.e., the diacid halide corresponding to an organic dicarboxylic acid by an interfacial reaction in an aqueous-organic reaction medium containing a deemulsifying agent, such as an alcohol. A polyarylene polymer is produced which is characterized by alternating moieties derived from the diacid halide alternating with moieties from the hydroxyaryl-substituted spirodilactam and optionally from the di(hydroxyphenyl) compound.

The hydroxyaryl-substituted spirodilactam precursor of the alkali metal salt reactant is a [4.4] spirodilactam having spiro ring nitrogen atoms in the 1- and 6-ring positions and having hydroxyaryl substituents on each of the spiro ring nitrogen atoms. One class of such spirodilactams comprises spirodilactams having up to 60 carbon atoms and is represented by the formula

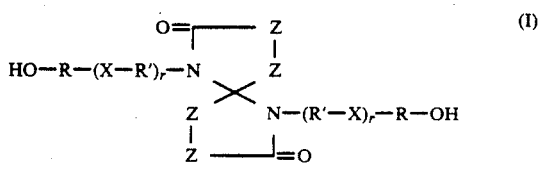

where Z independently is $>C(Z')_2$ in which Z' independently is hydrogen, lower alkyl of up to 4 carbon atoms inclusive, preferably methyl, or halogen, preferably the lower halogens fluoro and chloro, or aryl, preferably phenyl, or Z is such that two adjacent Z groups taken together form a ring system Z" of from 5 to 7 ring atoms, up to two of which are heteroatoms selected from nitrogen, oxygen or sulfur, with the remainder of the ring atoms being carbon atoms, there being up to 15 carbon atoms inclusive in each Z", two of which form a bridge between the carbon atoms connected by the adjacent Z groups. In the above formula I, R independently is aromatic of up to 15 carbon atoms and up to 2 aromatic rings, inclusive R' independently is R or an aliphatic group of up to 10 carbon atoms inclusive, r independently is 0 or 1 and X independently is a direct valence bond, alkylene of up to 8 carbon atoms inclusive, oxy, thio, sulfonyl, carbonyl, dioxyphenylene, 2,2-di(oxyphenyl)propane, i.e., di(oxyphenyl) sulfone, i.e., or dioxydiphenylene. Each of R and R' independently is hydrocarbyl containing only atoms of carbon and hydrogen or are substituted hydrocarbyl containing additional atoms present in the form of inert carbon atom substituents such as halogen, particularly the middle halogens, chloro or bromo.

Spirodilactams of a considerable variety of structures are therefore suitably employed as the spirodilactam precursor of the alkali metal salt reactant. In the embodiment where in the Z moieties of the above formula I are not part of a fused ring system and are therefore acyclic, i.e., Z is $>C(Z')_2$, the spirodilactam is illustrated by 1,6-di(4-hydroxyphenyl)-1,6-diazaspiro-[4.4]nonane-2,7-dione, 1,6-diL(3-hydroxy-4-chlorophenyl)-1,6-diazaspiro[4.4]nonane-2,7-dione, 1,6-di[3-(d-hydroxybenzoyl)phenyl]-1,6-diazaspiro[4.4]nonane-2,7 -dione, 1,6-di(4-hydroxyphenyl)-3,3,4,4,8,8,9,9-octamethyl-1,6-diazaspiro[4.4]-noname-2,7 dione, 1,6-di[4-(4'-hydroxybiphenyl)-3,3-dimethyl-1,6-diazaspiro[4.4]nonane-2,7-dione, 1,6-di[2-(4-hydroxyphenyl)-propyl]-1,6-diazaspiro[4.4]-noname-2,7-dione, 1,6-di(4-hydroxyphenyl)-3,4,8,9-tetra-fluoro-1,6-diazaspiro[4.4-]nonane-2,7-dione and 1,6-di(4-hydroxyphenyl-isopropyl)phenyl]-1,6-diazaspiro[4.4]-nonane-2,7-dione. In the embodiment wherein adjacent Z moieties on each spiro ring form a cyclic structure fused to the spiro ring system, i.e., adjacent z groups are Z", illustrative spirodilactams include 1,6-di(4-hydroxyphenyl)-3,4,8,9-dibenzo-1,6-diazaspiro[4.4]nonane-2,7-dione, 1,6-di[4-(4-hydroxphenyloxyphenyl]-3,4,8,9-di(pyrido)-1,6-diazaspiro [4.4]nonane-2,7-dione. Also suitable are those spirodilactams wherein one spiro ring has a fused ring substituent and the other spiro ring is free from fused ring substituents, e.g., 1,6-di(4-hydroxyphenyl)-3,4-hydroxynapthyl)]-3,4-cyclohexano-1,6-diazaspiro[4.4-]nonane-2,7-dione.

In general, compounds of the above formula I wherein R and R' are aromatic and hydrocarbon are preferred with further preference given to the compounds wherein r is 0. Within the spirodilactam portion of the molecule spiro rings which are substituted with hydrogen or methyl are preferred when Z is acyclic and rings substituted with benzo are preferred when adjacent Z moieties are Z''. The compound 1,6-di(4-hydroxyphenyl)-1,6-diazaspiro[4.4]noname-2,7-dione is a particularly preferred member of the former class whereas 1,6-di(4-hydroxyphenyl)-3,4,8,9-dibenzo-1,6-diazaspiro[4.4]nonane-2,7-dione is a particularly preferred member of the latter class.

The hydroxyaryl-substituted spirodilactams of formula I are compounds which are described in more detail and claimed as compositions of matter in copending allowed U.S. patent application Ser. No. 245,618, filed Sept. 16, 1988, now U.S. Pat. No. 4,939,251. The general methods of production, also described in this copending application, as well as in copending U.S. patent application Ser. No. 172,000, filed Mar. 23, 1988 and Ser. No. 172,052, filed Mar. 23, 1988, abandoned and the allowed continuing application thereof. Ser. No. 245,619, filed Sept. 16, 1988, now U.S. Pat. No. 4,889,9 , each of which incorporated herein by reference, is by reaction of at least one hydroxy-containing primary amino compound and a precursor of the spirodilactam. In terms of the substituted spirodilactam of the above formula I, the hydroxy-containing primary amino compound is represented by the formula HO—R—(X—R')$_r$—NH$_2$    (II)

where R, R', r and X have the previously stated meanings. The precursor of the spirodilactam is a 4-oxoheptanedioic acid compound or a 1,6-dioxa-spiro [4.4]nonane-2,7-dione spirodilactone compound. In terms of production of the substituted spirodilactams of formula I, the 4-oxoheptanedioic acid compound is represented by the formula

(IIIa)

where A independently is hydroxy, lower alkoxy of up to 4 carbon atoms or halo, preferably the middle halogens, chloro or bromo, and Z has the previously stated meaning. When the precursor of the spirodilactam is the spirodilactone, the spirodilactone to be employed for production of the spirodilactam of formula I is represented by the formula

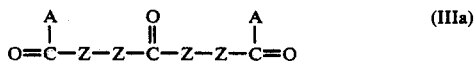

(IIIb)

where Z has the preivously stated meaning.

The acyclic 4-oxoheptanedioic acid compounds are known or are produced by known methods but certain of the esters are also particularly conveniently produced by the process of copending U.S. Pat. No. 4,800,231. The process involves reaction of formaldehyde with unsaturated carboxylic acid esters such as methyl acrylate or ethyl methacrylate in the presence of a catalyst system comprising a thiazolium salt and a teriary amine. Interconversion of the esters, acids or acid halides of formula IIIz is by conventional methods. The production of 4-oxoheptanedioic acid compounds which contain cyclic moieties is by the process of Cava et al, J. Am. Chem. Soc., 20, 6022 91955). The spirodilactones of formula IIIb are produced by the process of Pariza et al, Synthetic Communications, vol. 133), pp 243–254 91983) or by the process of U.S. Pat. No. 1,999,181.

the hydroxy-containing primary amino compound and the precursor of the spirodilactam will react in a molar ratio of 2:1 although in practice reactant ratios from about 8:1 to about 1:1.5 are satisfactory. Reactant ratios which are substantially stoichimetric are preferred. Reaction is conducted in a liquid phase solution in an inert reaction diluent such as an N-alkylamide, e.g., N,N-dimethylformamide or N-methyl-2-pyrrolidone. Reaction takes place at an elevated temperature, typically from about 80° C. to about 250° C., and at a reaction pressure sufficient to maintain the reaction mixture in the liquid phase. Such reaction pressures are up to about 20 atmospheres but more often up to about 10 atmospheres. Subsequent to reaction the spirodilactam product is recovered form the product mixture by conventional methods such as solvent removal, precipitation or chromatographic separations. Recovery of the spirodilactam product is not required, however, and particularly in cases where substantially stoichiometric quantities of reactants were employed the spirodilactam can be further reacted in situ as to produce the alkali metal salt.

The di(hydroxyphenyl) compound whose alkali metal salt is employed as an optional reactant. Illustrative of such compounds include dihydroxybenzenes such as hydroquinone and resorcinol, dihydroxynaphthalenes such as 2,7-dihydroxynaphthalene, 1,5-dihydroxynaphthalene or preferably a di(pb 4-hydroxyphenyl) compound represented by the formula

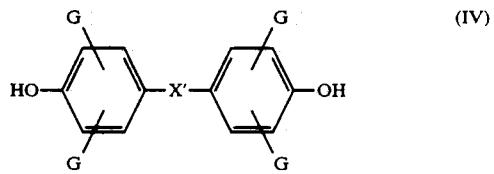

(IV)

where G independently is hydrogen, lower alkyl or middle halo and X' is a direct valence bond, alkylene of up to 15 carbon atoms, inclusive, oxy, thio, slufonyl or carbonyl. Illustrative of such di(hydroxyphenyl) compounds is 2,2-di(4-hydroxyphenyl)propane, 2,2-di(4-hydroxy-3-methylphenyl)methane, di(4-hydroxy-3-chlorophenyl) sulfone, 2,2-di(4-hydroxy-3,5-dibromophenyl)-propane, (4-hydroxyphenyl), (4-hydroxy-3,5-dibromophenyl) ether, 2-(4-hyroxyphenyl)-2-(4-hydroxy-3-chloro-5-methylphenyl)propane, 4,4'-dihydroxybiphenyl, di(4-hydroxyphenyl) ketone and di(4-hydroxy-3-methylphenyl) sulfide or position isomers thereof. The compounds of the above formula IV wherein each G is hydrogen or halo, and X' is 2,2-propylene are preferred and the compound 2,2-di(4-hydroxyphenyl)propane, also referred to as bisphenol A or BPA, is a preferred member of the class of di(hydroxyphenyl) compounds. These compounds are known or are produced by known methods.

The alkali metal salt of the hydroxyaryl-substituted spirodilactam compound, and, optionally of the di(hydroxypheynyl) compound, which is employed to produce the polyarylene polymers of the invention is prepared by conventional methods from the hydroxyaryl-substituted spirodilactam compound or the di(hydroxyphenyl) compound. While lithium, sodium, potassium, rubidium or desium slats of the hydroxy-containing reactants are usefully employed in the production of polymer, the preferred alkali metal salts are the sodium salt ot the potassium salt. In a typical production, the desired spirodilactam is dissolved in a suitable solvent such as 1,1,2-trichloroethane or N-methyl-2-pyrrolidone and an at least stoichiometric quantity of an alkali metal hydroxide, carbonate or bicarbonate is added to produce the alkali metal salt. The salt of the hydroxyaryl-substituted spirodilactam compound and/or the di(hydroxyphenyl) compound is recovered, if desired, as by solvent removal but typically is employed in the reaction with the diacid halide without isolation. In the modification where terpolymer is to be produced, it is useful to produce the alkali metal salt of the hydroxyaryl-substituted spirodilactam compound and the di(hydroxyphenyl) compound in the same reaction as by contacting a mixture of these hydroxy-containing compounds with an alkali metal base. Alternatively, however, the two alkali metal salts are produced separately and subsequently mixed.

The diacid halide reactant of the process of the invention is the acid halide of an aromatic dicarboxylic acid of up to 30 carbon atoms having two acid halide moieties as substitutents on carbon atoms of aromatic rings. One class of such acid halides is represented by the formula

where A' is halogen, preferably middle halogen and particularly chloro, and R'' is divalent arylene of up to 28 carbon atoms and from 1 to 2 aromatic rings, inclusive, and which rings, when two rings are present, are fused or connected by a linking group X, where X has the previously stated meaning. Illustrative diacid halides include phthaloyl chloride, isophthaloyl chloride, terephthaloyl bromide, 4,4'-dichlorocarbonylbiphenyl, di(bromocarbonylphenyl) ketone, isophthaloyl fluoride, 1,3-di(4-chlorocarbonylphenyloxy)benzene, di(3-bromocarbonylphenyl) ether, di[4-(4-chlorocarbonylphenyloxy)phenyl] sulfone, 2,2-[4-(4bromocarbonylphenyloxy) phenyloxy]propane and di(4-chlorocarbonylphenyl) sulfone. In general, the aromatic diacid halides which are otherwise hydrocarbyl, except for any additional atoms in divalent linking groups, are preferred and particularly preferred are those compounds wherein R'' has one aromatic ring. Best results are obtained when the diacid halide moieties are substituted on aromatic ring carbon atoms which are meta or para to each other, i.e., an isophthaloyl halide or a terephthaloyl halide.

The process of producing the polyarylene polymers of the invention comprises the reaction of the alkali metal salt of the hydroxyaryl-substituted spirodilactam compound and the alkali metal salt of the di(hydroxy) compound, if present, with the aromatic diacid halide to produce the linear polymer of alternating moieties derived from the hydroxyaryl-substituted spirodilactam compound, optionally the di(hydroxyphenyl) compound and from the aromatic diacid halide. The alkali metal salt of the di(hydroxyphenyl) compound is not, of course, always employed by when present it is present in a molar quantity of up to about 9 times the molar quantity of the alkali metal salt of the hydroxyaryl-substituted spirodilactam compound. Quantities of the alkali metal salt of the di(hydroxyphenyl) compound from about twice to about one-half of the quantity of spirodilactam salt are preferred. The diacid halide is employed in a molar ratio of from about 4:1 to about 1:4 as compared to the total of the other reactants. However, since the stoichiometry of the reaction is such that one mole of diacid halide reacts with one mole of other reactant, molar ratios of diacid halide to the total of the other reactants that are substantially stoichiometric, i.e., from about 1.5:1 to about 1:1.5, are preferred.

In part because of the difficulty of employing a reaction diluent in which the alkali metal salt reactant, or optionally, alkali metal salt reactants, and the diacid halide reactant are soluble, the polymerization is typically conducted unde rpolymerization conditions as an interfacial polymerization, that is, a polymerization that takes place at the interface of two substantially immiscible solvents. In such a polymerization, one type of reactant is customarily present in each of the two solvent phases. In the case of the reactants of the present invention, the process is conducted in a reaction environment where one phase is aqueous and the other phase comprises an inert, water immiscible organic solvent, such as an aromatic hydrocarbon, including toleune or xylene, ethers, including tetrahydrofuran or dioxane, ketones or chlorinated aliphatic hydrocarbons, including methylene chloride, 1,1,2-trichloroethane or chloroform, or the like. In a particularly preferred embodiment, the hydroxyaryl-substituted spirodilactam compound, the di(hydroxyphenyl) compound, if present, and an aqueous alkali metal hydroxide are added to the solvent system while vigorous stirring or other agitation is maintained. Subsequent to this in situ production of alkali metal salt reactant, the aromatic dicarboxylic acid halide reactant is added, also with agitation, and the polymerization takes place at the phase interface.

The reaction is facilitated by utilization of a phase transfer catalyst capable of accelerating interphase reaction in aqueous-organic systems, such as an onium salt, one of the cyclic large-ring polyethers, known as crown ethers, or a surface-active agent. Suitable phase-transfer catalysts are described in U.S. Pat. No. 4,110,360, the disclosure of which are incorporated by reference.

The phase transfer catalyst can be an onium compound such as:

(1) a quaternary onium compound of the formula

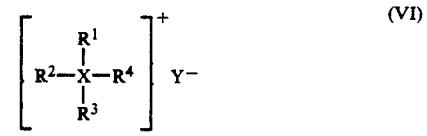

wherein X is nitrogen, phosphorus or arsenic atom, $R^1$, $R^2$, $R^3$ and $R^4$ each independently is an alkyl group of 1 to 20 carbon atoms, an aralkyl or alkaryl group of 7 to 9 carbon atoms or an aryl group of 6 to 12 carbon atoms and Y is a monovalent ion; or (2) a sulfonium compound of the formula

wherein $R^5$, $R^6$ and $R^7$ each independently is an alkyl group of 1 to 40 carbon atoms and Y is a monovalent ion.

In formulas VI and VII above, Y can be hydroxide, halide, (alkyl)sulfate, (alkyl)sulfonate, (aryl)sulfonate, tetrafluoroborate, phosphate, nitrate or alkyl- or arylcarboxy and the like. When these catalysts are available in a neutralized form, for instance in the chloride form, they must be activated to the hydroxyl form by treatment with an aqueous alkali metal hydroxide, for example, sodium hydroxide, and washed with water to remove salt anions before use.

More particularly, one preferred subclass of catalysts of formula VI are those in which $R^1$, $R^2$, $R^3$ and $R^4$ each independently is an alkyl group of 1 to about 8 carbon atoms such as methyl-trioctylammonium chloride, tributylammonium bromide, tetra-n-butylammonium hydroxide, bromide or chloride, methyl-tri-2-methylheptylammonium chloride, tetramethylammonium bromide, tetrabutylphosphonium bromide or tetraethylammonium bromide. Other suitable catalysts of this type are known under the trade names "Hyamine 1622", "Hyamine 2389", "Hyamine 3500", "Aliquat 336" and "Adogen 464" (all five trade names are registered trademarks).

Another preferred subclass of catalysts of formula VI are those containing one or more phenyl or benzyl groups as $R^1$, $R^2$, $R^3$ and $R^4$ such as triethylbenzylammonium chloride or ethyltriphenylphosphonium bromide or the like.

The phase transfer catalysts can also be hexaoxacyclooctadecane polyethers known as "crown ethers". These compounds, together with their preparation, are described in the literature, for example, in *Tetrahedron Letters* No. 18 (19720 pp. 1793-1796, and are commonly designated by reference to the total number of atoms forming the macrocyclic ring together with the number of oxygen atoms in that ring. Thus the macrocyclic polyether whose formal chemical name is 1,4,7,10,13,16-hexaoxacyclooctadecane is designated as "18-crown-6".

Other suitable catalysts are surface-active agents. A "surface-active agent" is defined as in Kirk-Othmer, "Encyclopedia of Chemical Technology", second edition, volume 19 (1969), page 508: "An organic compound that encompasses in the same molecule two dissimilar structural groups, one being water-soluble and one being water-insoluble".

The surface-active agent is preferably non-ionic. Non-ionic synthetic surface-active agents may be broadly defined as compounds aliphatic or alkylaromatic in nature which do not ionize in water solution. For example, a well-known class of non-ionic agents is made available on the market under the trade name of "Pluronic". These compounds are formed by condensing ethylene oxide with a hydrophobic base formed by condensation of propylene oxide with propylene glycol. The hydrophobic portion of the molecule which, of course, exhibits water insolubility has a molecular weight of from about 1,500 to 1,800. The addition of polyoxyethylene radicals to this hydrophobic portion tends to increase the water solubility of the molecule as a whole and the liquid character of the product is retained up to the point where polyoxyethylene content is about 50% of the total weight of the condensation product.

Other suitable non-ionic agents are defined in U.S. Pat. No. 4,110,360, incorporated by reference, and include:

(1) polyethylene oxide condensates of alkyl phenols, (2) condensation products of ethylene oxide with the product resulting from the reaction of propylene oxide and ethylenediamine, (3) condensation product of aliphatic alcohols having from about 8 to 18 carbon atoms with ethylene oxide, (4) long chain tertiary amine oxides, (5) long chain tertiary phosphine oxides, (6) dialkyl sulfoxides, (7) ammonia, monoethanol and diethanol amides of fatty acids having an acyl moiety of from about 8 to about 18 carbon atoms, (8) sorbitan monoesters of long chain fatty acids having about 8 to 20 carbons atoms, and (9) alkylbenzenes containing a straight chain alkyl group of from about 8-20 carbon atoms and the like.

Trialkybenzylammonium halides, such as triethylbenzylammonium chloride, are particularly useful as phase transfer agents.

The amount of catalyst can be readily determined by those of skill in the art. By way of illustration, the amount of catalyst to the amount of oxyaryl-substituted spirodilactam compound is in a molar ration of from about 1:5 to about 1:500, preferably from about 1:10 to about 1:100.

The deemulsifying agent is any agent which under the reaction conditions aids in preventing, reducing or breaking emulsions in the aqueous-organic reaction medium and does not substantially dissolve the polyarylate. The deemulsifying agent is suitably a compound having hydrophobic and hydrophillic groups in the same molecule, of which the art is familiar, and includes aionics, non-ionics, cationics and amphoterics. Non-ionic deemulsifying agents are preferred and are those containing hydroxyl groups, such as alcohols, glycols, polyols and derivative thereof containing at least one hydroxyl group. Preferably the deemulsifying agent is an alcohol.

Suitable alcohols are lower alkanols, e.g., of up to 7 carbon atoms, such as ethanol, butanol, isopropanol and the like. Isopropanol is preferred. Glycols and polyols are also alcohols which can be used in the a process of the invention. The amount of alcohol is usually a minor amount compared to the amount of inert water-immiscible organic solvent of the reaction medium in which the polyarylate is soluble. The amount of alcohol need only be sufficient to prevent or break emulsions in the aqueous-organic reaction medium and can readily be determined by those of skill in the art. By way of illustration the alcohol is usually present in a volume ratio to organic solvent of from about 1:2 to about 1:20 and preferably from about 1:10 to about 1:6.

It is possible that some deemulsifying agents can also serve as the phase transfer catalyst.

The reaction temperature is typically near or below ambient temperature and temperatures from about 0° C. to about 100° C. are satisfactory, preferably from about 0° C. to about 35° C. The reaction pressure to be used will be one that is sufficient to maintain the reaction mixture in a liquid state. Such pressures are typically up to 20 atmospheres but more often are from about 0.8 atmosphere to about 5 atmospheres. Subsequent to reaction the polymer is typically in the organic phase and is recovered therefrom by conventional methods such as selective extraction or precipitation with a non-solvent followed by filtration or decantation.

The polyarylene copolymer or terpolymer is a linear polymer having di(carbonyl)arylene compound moieties illustratively resulting from loss of the halogens of the aromatic dicarboxylic acid halide alternating with moieties of an oxyaryl-substituted spirodilactam compound illustratively derived by loss of the hydroxy hydrogens of the hydroxyaryl-substituted spirodilactam compound and, optionally, moieties of a di(oxyphenyl) compound illustratively derived from the di(hydroxyphenyl) compound by loss of the hydroxy hydrogens. In terms of the preferred reactants as described above (formulas I, IV and V), the copolymer product is represented by the repeating first segment formula

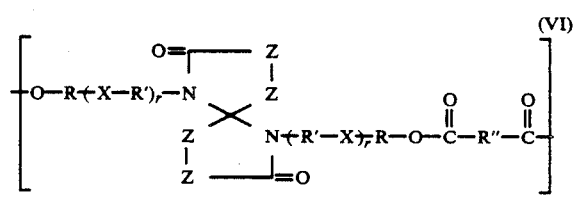

(VI)

wherein R, R', R", X and Z have the previously stated meanings. The terpolymer product additionally contains a preferred second repeating segment of the formula

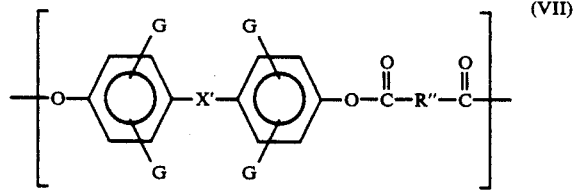

(VII)

wherein G, R" and X' have the previously stated meanings. Within the terpolymer chain the segments of formula VI and of formula VII are found randomly and the molar quantity of the second segment will be up to about 9 times the molar quantity of the first segment but preferably from about twice to about one-half of the quantity of the first segment.

The nomenclature of such polymers is not easily determined because of the complexity thereof but the identity of such products will be apparent from consideration of the formulas for the reactants and the polymer product. However, by way of illustration is the copolymer having alternating units of 1,3-dicarbonylbenzene and 1,6-di(4-oxyphenyl)-1,6-diazaspiro[4.4]nonane-2,7-dione produced from isophthaloyl chloride and the sodium salt of 1,6-di(4-hydroxyphenyl)-1,6-diazaspiro[4.4]nonane-2,7-dione, and the copolymer having alternating units of 4,4'-dicarbonylbiphenyl and 1,6l-di(4-oxyphenyl)-3,4,8,9-dibenzo-1,6-diazaspiro[4.4-]nonane-2,7-dione produced by reaction of 4,4'-di(-bromocarbonyl)biphenyl and the potassium salt of 1,6-di(4-hydroxyphenyl)-3,4,8,91-dibennzo-1,6-diazaspiro[4.4]nonane-2,7-dione. Corresponding terpolymers containing units of 2,2-di(4-oxyphenyl)propane are produced when the reaction mixture additionally contains the sodium salt of 2,2-di(4-hydrooxyphenyl)propane. Polymer products of the above formula VI and optionally VII are preferred wherein each r is O and R" comprises a single aromatic ring. Spirodilactam moieties wherein Z is acyclic $>C(X')_2$ and Z' is hydrogen or methyl, especially hydrogen, are preferred, as are spirodilactam moieties having adjacent Z groups as Z" wherein Z" is benzo. The high molecular weight polymers of the above formula V have a molecular weight from about 10,000 to about 100,000.

The high molecular weight polyarylate copolymers and terpolymers of the invention are thermoplastic polymers characterized by relatively high glass transition temperatures, typically over 200° C. or even higher. Thus, the polyacrylate polymers enjoy the utility possessed by other thermoplastics of being processable by conventional techniques such as extrusion, injection molding or thermoforming into useful films, sheets, fibers and molded articles. However, the polymers of the invention are processed into shaped articles useful for high temperature applications where dimensional stability at elevated temperature is desired. Among such applications are the production of containers for food and drink and the production of base materials for electric and electronic applications.

The invention is further illustrated by the following Illustrative Embodiments which should not be construed as limiting.

ILLUSTRATIVE EMBODIMENT I

The monomers, terephthaloyl chloride and isophthaloyl dichloride, obtained from Aldrich were purified by distillation. Bisphenol A was used as received.

A 2 liter four necked flask equipped with mechanical stirrer, thermometer, and nitrogen gas inlet and outlet was charged with 8.11 g (0.024 mole) of 1,6-di(hydroxyphenyl)-1,6-diazaspiro[4.4]nonane-2,7-dione (spirodilactam diphenol), 8.22 g (0.36 mole) of bisphenol A, 0.4 g of triethyl benzyl ammonium chloride, 0.04 g of sodium bisulfite, 5.28 g of sodium hydroxide, 270 ml of distilled water, 420 ml of chloroform and 50 ml of isopropyl alcohol. The reaction mixture was stirred at a motor speed of 1000 rpm under nitrogen at a temperature not exceeding 10° C. A solution of isophthaloyl chloride (12.18 g, 0.06 mole) in 70 ml of chloroform was added over a period of 30 minutes. The reaction was then warmed up to room temperature and continued for an additional 12 hours. Subsequently, the upper layer was decanted and replaced by 100 ml of distilled water and 30 ml of chloroform. The mixture was again stirred for 20 minutes. The organic layer was poured into methanol. A white polymer was precipitated and collected by filtration, washed with water and dried. The molecular structure of the repeating units of the polymer was confirmed by NMR and IR. The polymer had a Tg of 233° C. and an inherent viscosity of 0.81 dl/g.

ILLUSTRATIVE EMBODIMENT II

An experience similar to Embodiment I was conducted with a 30:70 molar ratio of [4.4] spirodilactam diphenol: bisphenol A. The molecular structure of the repeating units of the polymer was confirmed by NMR and IR spectra. The polymer had a Tg of 220° C and an inherent viscosity of 0.74 dl/g.

ILLUSTRATIVE EMBODIMENT III

An experiment similar to Embodiment I was conducted with a 50:50 molar ratio of [4.4] spirodilactam diphenol: bisphenol A. The molecular structure of the repeating units of the polymer was confirmed by NMR and IR spectra. The polymer had a Tg of 247° C. and an inherent viscosity of 0.83 dl/g.

What is claimed is:

1. An interfacial polymerization process for preparing high molecular weight polyarylates which comprises reacting under interfacial polyarylate-forming conditions, (a) a hydroxyaryl-substituted [4.4] spirodilactam having the spiro ring nitrogen atoms at the 11- and 6-positions of the spirodilactam ring having a hydroxyaryl substituent on each of said spiro ring nitrogen atoms with (b) an aromatic diacid halide with or without, (c) a di(hydroxyphenyl) compound, in the presence of an aqueous caustic solution containing an alkali or alkaline earth metal hydroxide, an inert water immissible organic solvent, which substantially dissolves the organic reactants and the polyarylate, and deemulsifying agent which does not substantially dissolve the polyarylate.

2. The process according to claim 1 wherein the organic solvent is a chlorinated aliphatic hydrocarbon.

3. the process according to claim 1 or 2 wherein the chlorinated aliphatic hydrocarbon is chloroform.

4. The process according to claim 1 or 2 wherein a catalyst is also present.

5. The process according to claim 4 wherein the catalyst is a tertiary amine or quaternary ammonium salt.

6. The process according to claim 5 wherein the catalyst is triethylbenzylammonium chloride.

7. The process according to claim 1 or 2 wherein the deemulsifying agent is a lower alkanol.

8. The process according to claim 7 wherein the alcohol is isopropanol.

9. The process according to claim 1 or 2 wherein the reaction is conducted at temperature in the range of from about 0° C. to about 100° C.

10. The process according to claim 9 wherein the temperature is from about 0° C. to about 35° C.

11. The process according to claim 1 or 2 wherein (a) and (c), when present, each is used in the form of a di(alkali metal) salt.

12. The process according to claim 1 wherein the deemulsifying agent is a lower alkanol and the organic solvent is a chlorinated aliphatic hydrocarbon.

13. The method according to claim 1 wherein the polymer comprises a first repeating segment of the formula

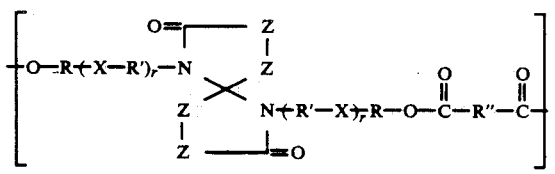

with or without up to nine times the molar quantity of the first segment of a second repeating segment of the formula

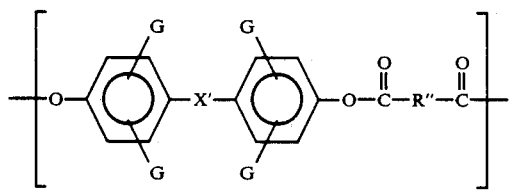

wherein R is aromatic of up to 15 carbon atoms and up to two aromatic rings, inclusive, R' is R or aliphatic of up to 10 carbon atoms, r is 0 or 1, X is a direct valence bond or X is alkylene of up to 15 carbon atoms inclusive, oxy, thio, sulfonyl, carbonyl, dioxyphenylene, 2,2-di(oxyphenyl)propane, di(oxyphenyl) sulfone or dioxydiphenylene, R" is divalent arylene of up to 28 carbon atoms and from 1 to 2 aromatic rings, inclusive, Z independently is >C(X')$_2$ in which Z' independently is hydrogen, lower alkyl, lower halo or phenyl, or Z is such that two adjacent Z groups taken together form a ring system Z" of from 5 to 7 ring atoms, up to two of which are heteroatoms selected from nitrogen, oxygen or sulfur with the remainder of the ring atoms being carbon atoms, there being up to 15 carbon atoms in each Z", two of which form a bridge between the carbon atoms connected by the adjacent Z groups, X' is a direct valence bond or X' is alkylene of up to 8 carbon atoms inclusive, oxy, thio, sulfonly or carbonyl and G independently is hydrogen, lower alkylene or middle halo.

14. The process according to claim 13 wherein in the polymer is a polymer of the first repeating segment.

15. The process according to claim 14 wherein in the polymer each r is 0.

16. The process of claim 15 wherein in the polymer R" has a single aromatic ring.

17. The process according to any one of claims 13, 14, 15 or 16 wherein in the polymer Z is >C(Z')$_2$.

18. The process of claim 17 wherein in the polymer R is phenylene.

19. The process of claim 18 wherein in the polymer Z is hydrogen.

20. The process of any one of claims 13, 14, 15 or 16 wherein in the polymer the carbon atoms through which R— is connected to the remainder of the polymer chain are meta or para to each other.

21. The process of claim 20 wherein in the polymer R is p-phenylene.

22. The process of any one of claims 13, 14, 15 or 16 wherein in the polymer adjacent Z groups are Z".

23. The process of claim 22 wherein in the polymer R is phenylene.

24. The process of claim 23 wherein in the polymer Z— is benzo.

25. The process of claim 22 wherein in the polymer R is p-phenylene.

26. The process of claim 13 wherein in the polymer is a polymer of said first and second repeating segments.

27. The process of claim 26 wherein in the polymer G is halo.

28. The process of claim 27 wherein in the polymer G is bromo.

29. The process of claim 28 wherein in the polymer each r is 0.

30. The process of claim 29 wherein in the polymer R— has a single aromatic ring.

31. The process of claim 30 wherein in the polymer X— is 2,2-propylene.

32. The process of claim 31 wherein in the polymer Z is >C(Z—)$_2$.

33. The process of claim 32 wherein in the polymer R is phenylene.

34. The process of claim 33 wherein the polymer Z— is hydrogen.

35. The process of any one of claims 26, 27, 28, 29, 30, 31, 32, 33 or 34 wherein in the polymer the carbon atoms through which R— is connected to the remainder of the polymer chain are meta or para to each other.

36. The process of claim 35 wherein in the polymer R is p-phenylene.

37. The process of any one of claims 26, 27, 28, 29, 30 or 31 wherein in the polymer adjacent Z groups are Z—.

38. The process of claim 37 wherein in the polymer Z— is benzo.

39. The process of claim 38 wherein in the polymer R is p-phenylene.

40. The process of claim 13 or 26 wherein in the polymer the second segment is present at up to twice the molar quantity of the first segment.

* * * * *